(12) United States Patent
Rule et al.

(10) Patent No.: US 6,274,212 B1
(45) Date of Patent: Aug. 14, 2001

(54) METHOD TO DECREASE THE ACETALDEHYDE CONTENT OF MELT-PROCESSED POLYESTERS

(75) Inventors: Mark Rule, Atlanta; Yu Shi, Tucker, both of GA (US); Xiaoyan Huang, Spartanburg, SC (US)

(73) Assignee: The Coca-Cola Company, Atlanta, GA (US)

( * ) Notice: Subject to any disclaimer, the term of this patent is extended or adjusted under 35 U.S.C. 154(b) by 0 days.

(21) Appl. No.: 09/510,014

(22) Filed: Feb. 22, 2000

(51) Int. Cl.[7] .............................. B29D 22/00; C08F 20/00
(52) U.S. Cl. ...................... 428/36.92; 525/437; 528/272; 428/35.7
(58) Field of Search ........................... 525/437; 528/272; 428/35.7, 36.92

(56) References Cited

U.S. PATENT DOCUMENTS

| | | | |
|---|---|---|---|
| 3,956,324 | 5/1976 | Jost | 260/368 |
| 4,368,286 | 1/1983 | Hayashi et al. | 524/394 |
| 4,552,791 | 11/1985 | Hahn | 428/35 |
| 4,837,115 | 6/1989 | Igarashi et aL. | 428/36.92 |
| 4,840,981 | 6/1989 | Hasuo et al. | 524/114 |
| 4,886,847 | 12/1989 | Bastioli et al. | 524/84 |
| 4,894,404 | 1/1990 | Minnick | 524/226 |
| 5,084,356 | 1/1992 | Deak et al. | 428/458 |
| 5,085,904 | 2/1992 | Deak et al. | 428/35.7 |
| 5,102,943 | 4/1992 | Logullo | 524/487 |
| 5,258,233 | 11/1993 | Mills et al. | 428/480 |
| 5,266,416 | 11/1993 | Inoue et al. | 428/651 |
| 5,298,550 | 3/1994 | Riccardi et al. | 524/513 |
| 5,340,884 | 8/1994 | Mills et al. | 125/420 |
| 5,364,666 | 11/1994 | Williams et al. | 427/579 |
| 5,378,510 | 1/1995 | Thomas et al. | 427/563 |
| 5,389,710 | 2/1995 | Dege et al. | 524/243 |
| 5,405,921 | 4/1995 | Muschiatti et al. | 525/444 |
| 5,462,779 | 10/1995 | Misiano et al. | 428/34.7 |
| 5,468,520 | 11/1995 | Williams et al. | 427/560 |
| 5,510,155 | 4/1996 | Williams et al. | 427/532 |
| 5,531,060 | 7/1996 | Fayet et al. | 53/426 |
| 5,587,191 | 12/1996 | Donsbach et al. | 426/66 |
| 5,616,369 | 4/1997 | Williams et al. | 427/536 |
| 5,650,469 | 7/1997 | Long et al. | 525/425 |
| 5,670,224 | 9/1997 | Izu et al. | 428/35.8 |
| 5,691,007 | 11/1997 | Montgomery | 427/576 |
| 5,704,983 | 1/1998 | Thomas et al. | 118/723 |
| 5,985,389 | * 11/1999 | Dalton et al. | 428/35.7 |

FOREIGN PATENT DOCUMENTS

| | | |
|---|---|---|
| 0460796A2 | 12/1991 | (EP) . |
| WO 96/04833 | 2/1996 | (WO) . |

* cited by examiner

*Primary Examiner*—Samuel A. Acquah
(74) *Attorney, Agent, or Firm*—Sutherland, Asbill & Brennan LLP

(57) ABSTRACT

A method for decreasing acetaldehyde content of melt processed polyester comprising combining with melted polyester an organic additive compound which scavenges acetaldehyde from the polyester without imparting discoloration to the polyester. The organic additive compound comprises at least two hydrogen substituted heteroatoms bonded to carbons of the organic additive compound such that the organic additive compound is reactive with acetaldehyde in the polyester to form water and a resulting organic compound comprising an unbridged five or six member ring including the at least two heteroatoms. The reduced acetaldehyde content polyester is particularly useful for making containers such as for packaging beverages.

20 Claims, No Drawings

METHOD TO DECREASE THE ACETALDEHYDE CONTENT OF MELT-PROCESSED POLYESTERS

FIELD OF INVENTION

The present invention relates to polyester products such as poly(ethylene terephthalate) containers. More particularly, this invention relates to reduction of acetaldehyde content of melt-processed polyesters by incorporation of additives capable of reacting with acetaldehyde.

BACKGROUND OF THE INVENTION

Polyesters, especially poly(ethylene terephthalate) (PET) are versatile polymers that enjoy wide applicability as fibers, films, and three-dimensional structures. A particularly important application for PET is for containers, especially for food and beverages. This application has seen enormous growth over the last 20 years, and continues to enjoy increasing popularity. Despite this growth, PET has some fundamental limitations that restrict its applicability. One such limitation is its tendency to generate acetaldehyde (AA) when it is melt processed. Because AA is a small molecule, AA generated during melt processing can migrate through the PET. When PET is processed into a container, AA will migrate over time to the interior of the container. Although AA is a naturally occurring flavorant in a number of beverages and food products, for many products, the taste imparted by AA is considered undesirable. For instance, AA will impart a fruity flavor to water, which detracts from the clean taste desired for this product.

PET is traditionally produced by the transesterification or esterification/polymerization of a terephthalate precursor (either dimethyl terephthalate or terephthalic acid) and ethylene glycol. If the end use application for the melt-polymerized PET is for food packaging, the PET is then subject to a second operation known as solid-state polymerization (SSP), whereby the molecular weight is increased and the AA generated during melt processing is removed. A widely used method to convert the SSP PET into containers consists of drying and remelting the PET, injection molding the polymer into a container precursor (preforms), and subsequently stretch blow-molding the preform into the final container shape. It is during the remelting of the PET to fashion the container preforms that AA is regenerated. Typical preform AA levels for PET processed in the most modern injection molding equipment is 6–8 $\mu$/g (ppm).

Historically, the impact of AA on product taste has been minimized by careful control of the melt processing conditions used to make containers or preforms, and by use of special processing conditions in polymer preparation. This approach is successful for most packages, where the taste threshold for AA is sufficiently high, or where the useful life of the container is sufficiently short. However, obtaining low AA carries with it a significant cost. That cost includes the need to carry out a separate processing step after the melt polymerization of PET (solid-state polymerization), the need for specially designed injection molding equipment, and the need to continually monitor the AA content during container production. For other applications, where the desired shelf-life of the container is longer, the product is more sensitive to off-taste from AA, or the prevailing environmental conditions are warmer, it is not possible to keep the AA level below the taste threshold by using these methods. For example, in water, the taste threshold is considered to be less than about 40 $\mu$/L (ppb), and often a shelf-life of up to two years is desired. For a PET bottle that can contain 600 ml of beverage, a preform AA content of 8 ppm can result in a beverage AA level greater than 40 ppb in as little as one month.

In addition to careful control of melt-processing conditions for PET, prior art methods include modifications to the injection molding process to minimize the thermal and shear heating of the PET; use of lower IV resins, and the use of lower melting PET resins. Each of these approaches have been only partially successful, and each suffer from their own limitations. For example, specially designed injection molding equipment entail higher capital cost for the equipment. Lower IV resins produce containers that are less resistant to environmental factors such as stress crack failure. Lower melting resins are achieved by increasing the copolymer content the PET resin. Increasing the copolymer content also increases the stretch ratio of the PET, which translates into decreased productivity in injection molding and blow molding.

Another prior art approach has been to incorporate additives into PET that will selectively react with, or scavenge, the AA that is generated. Thus, Igarashi (U.S. Pat. No. 4,837,115) discloses the use of amine-group terminated polyamides and amine-group containing small molecules. Igarashi teaches that the amine groups are effective because they can react with AA to form imines, where the amine nitrogen forms a double bond with the AA moiety. Igarashi teaches that essentially any amine is effective. Mills (U.S. Pat. Nos. 5,258,233; 5,650,469; and 5,340,884) and Long (U.S. Pat. No. 5,266,416) claim the use of various polyamides, especially low molecular weight polyamides. Turner and Nicely (WO 97/28218) claim the use of polyesteramides. These polyamides and polyesteramides are believed to react with AA in the same manner as described by Igarashi.

While these AA scavengers are effective at reducing the AA content of melt-processed PET, they suffer from their own drawbacks. In particular, relatively high loadings of the polyamides are needed to effect significant AA reductions, and a very significant yellowing of the PET occurs on incorporation of these amine-containing additives. This color formation is believed to be due to the color of the imine group itself, and is thus unavoidable. The yellow color formation inherently limits this approach to articles where the PET can be tinted to mask the color. Unfortunately, most PET articles in use today are clear and uncolored.

Therefore, there is a need for a simple and economical method for reducing AA content in polyester products without using special polyester, melt-processing equipment, or melt-processing conditions and without discoloring the polyester product.

SUMMARY OF THE INVENTION

This invention satisfies the above described need by providing a method for decreasing acetaldehyde content of melt processed polyester comprising combining with melted polyester an organic additive compound which reacts with acetaldehyde to form water and a resulting organic compound. The resulting organic compound does not impart an off taste to beverages packaged in containers made with this treated polyester and does not discolor the polyester. The organic additive compound can be added at relatively low levels to the polyester and still sufficiently decrease the acetaldehyde content of the polyester. In addition, combining the organic additive compound to the polyester requires no special equipment or processing steps.

More particularly, the organic additive compound comprises at least two hydrogen-substituted heteroatoms bonded to carbons of the organic additive compound such that the organic additive compound is reactive with acetaldehyde in the polyester to form water and the resulting organic compound. The resulting organic compound comprises an unbridged five or six member ring including the at least two heteroatoms. Suitable heteroatoms include oxygen, sulfur, and nitrogen. Desirably, the organic additive compound is substantially thermally stable at the melt processing temperature of the polyester.

This invention also encompasses a composition for use in making polyester articles with decreased acetaldehyde content comprising polyester and the above-described organic additive compound. The organic additive compound is particularly effective in reducing acetaldehyde content of polyesters formed from ethylene glycol and diacids or diesters of such acids. A particularly preferred polyester is poly (ethylene terephthalate) (PET).

Furthermore, this invention encompasses containers made with the above described composition comprising polyester and the above described organic additive compound and packaged beverages comprising a beverage disposed in such a container.

Other objects, features, and advantages of this invention will become apparent from reading the following specification and claims.

DETAILED DESCRIPTION OF EMBODIMENTS OF THE INVENTION

As summarized above, the present invention relates to a method for substantially decreasing the acetaldehyde (AA) content of melt-processed polyesters, especially PET, by combining low levels of an organic additive compound with the polyester during melt processing. The organic additive compound scavenges the AA in the polyester by chemically reacting with the AA.

Suitable organic additive compounds effective in the present invention can be characterized as small molecules that include at least two hydrogen-substituted heteroatoms bonded to carbons of the organic additive compound such that the organic additive compound is reactive with acetaldehyde in the polyester to form water and a resulting organic compound comprising an unbridged 5- or 6-member ring including the at least two heteroatoms. Unlike the prior art methods that depend on the formation of inherently colored imines, the formation of unbridged 5 or 6 member ring structures do not inherently result in color formation. In addition, thermodynamics often favor ring formation more than imine formation; thus, significantly lower amounts of the organic additive compound of this invention can effectively decrease the AA content of melt-processed polyesters.

The heteroatoms capable of reacting with AA include oxygen (O), nitrogen (N), and sulfur (S). The heteroatoms of the additive compound should have at least one bond to an active hydrogen (H), and in the course of condensing with AA should split off water. Preferred functional groups containing these heteroatoms include amine ($NH_2$ and NHR), hydroxyl (OH), carboxyl ($CO_2H$), amide ($CONH_2$ and CONHR), sulfonamide ($SO_2NH_2$), and thiol (SH). It is necessary for these functional groups to be sterically arranged so that on condensation with AA an unbridged 5 or 6 member ring can be formed. It is preferred that the structural arrangement allows the formation of a six member ring. It is especially preferred that heteroatoms of the organic additive are attached to a preformed ring or rings. It is most preferred that the preformed ring(s) are aromatic so that the unbridged 5 or 6-member ring of the resulting organic compound is bonded to the aromatic ring.

Suitable organic additive compounds are substantially thermally stable at the temperatures required for melt-processing the polyester. It is also preferred that the organic additive compound include functional groups which include the is heteroatoms and active hydrogens and are relatively unreactive toward the ester linkages present in polyesters. High thermal stability and low reactivity with ester linkages increase the amount of unreacted organic additive compound that will be available for condensation with AA, thus reducing the amount needed to achieve effective levels of AA scavenging. Compounds with decomposition temperatures>270 deg C. as measured by Thermal Gravimetric Analysis (TGA) are desirable and compounds with decomposition temperatures>300 deg C. are most preferred. Compounds that decompose by intramolecular elimination reactions at temperatures less than about 200 deg C. are least likely to be effective.

Examples of additives that meet the above requirements and are effective at decreasing the AA content of melt-processed polyesters include anthranilamide, salicyclamide, salicylanilide, o-phenylenediamine, 3,4-diaminobenzoic acid, 1, 8-diaminonaphthalene, o-mercaptobenzamide, N-acetylglycinamide, malonamide, 3-mercapto-1,2-propanediol, 4-amino-3-hydroxybenzoic acid, 4, 5-dihydroxy-2, 7-naphthalenedisulfonic acid disodium salt, biuret, 2,3-diaminopyridine, 1, 2-30 diaminoanthraquinone, dianilinoethane, allantoin, 2-aminobenzenesulfonamide, and 2-amino-2-methyl-1,3-propanediol. Preferred additives include 1, 8-diaminonaphthalene, salicylamide, salicylanilide, allantoin, and anthranilamide. Especially preferred is anthranilamide because of its low cost, efficacy, and ease of incorporation into PET.

Examples of additives that are capable of forming 5 or 6 member rings, but lack the necessary thermal stability include tetraethylenepentamine, cysteine, asparagine, and 1,3-diaminopentane. Examples of additives that are not capable of forming 5 or 6 member rings, and which show no efficacy at decreasing the AA content of melt-processed polyesters include methyl anthranilate, 2-amino dimethyl terephthalate, and stearylamine. It should be noted that Igarashi teaches that additives such as these will be effective in reducing the AA content of PET.

The amount of organic additive compound necessary to achieve the desired decrease in AA content is dependent on which specific additive compound is used, and the amount of reduction required. Organic additive compounds which are relatively more effective can achieve greater than 90% reduction in AA content at loadings of between 200 and 500 ppm; additives which are relatively less effective may require addition levels up to 1000 ppm. In all cases, however, the effectiveness of the claimed additive compounds is greater than that of the prior art AA scavengers.

The organic additive compounds are most effective in reducing AA in polyesters formed from ethylene glycol and diacids or diesters of such acids. Such polyesters include poly(ethylene terephthalate), poly(ethylene naphthalate), poly(ethylene adipate), poly(ethylene isophthalate), and blends or copolymers of the same. Additional glycol linkages that may be present as comonomers include cyclohexanedimethanol, diethylene glycol, 1,2-propanediol, neopentylene glycol, 1,3-propanediol, and 1,4-butanediol.

The method of incorporation of the claimed organic additive compounds into polyesters is not critical. The additive compounds can be dispersed in a liquid carrier and mixed with the polyester pellets immediately before injection molding. They may also be incorporated by spraying a slurry of the additive in water onto the pellets prior to drying. They may be incorporated by injection of a melt or suspension of the additive into pre-melted polyester. They also may be incorporated as a masterbatch pelletipellet blend. They may also be incorporated by making a masterbatch of the additive with PET and then mixing the masterbatch pellets with PET pellets at the desired level before drying and injection.

The following equations illustrate the condensation reaction of suitable organic additive compounds of this invention with acetaldehyde to form water and a resulting compound with an unbridged ring:

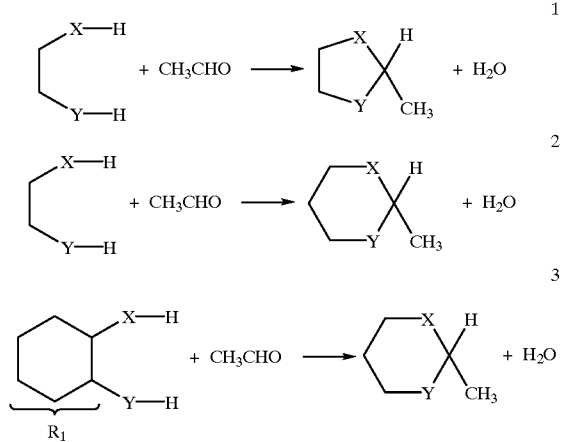

In the foregoing equations, X—H and Y—H represent functional groups including at least one active hydrogen represented by H and a heteroatom such as O, N, or S. In equation 3, R1 represents a ring which could be a 5 or 6 member ring and could be aromatic or nonaromatic.

The composition comprising polyester and the organic additive compound is particularly suitable for making containers such as a container for use in packaging beverages, because of the reduced acetaldehyde content. With the reduced acetaldehyde content, the containers impart less of an off taste to the beverages. This is particularly important for beverages, such as water, which do not have a strong flavor. Containers can be made with the composition of the present invention using conventional methods such as injection molding and blow molding. A typical method would be to form a preform with the polyester composition and organic additive compound and then blow mold the beverage container. The resulting containers can be used in the manufacture of package beverages according to conventional manufacturing methods.

EXAMPLES

The following examples 1–16 and 30–54 illustrate the use of the organic additive compounds of this invention for decreasing the AA content of melt-processed PET. Examples 17–29 are comparative examples illustrating prior art. In these examples, the AA content was determined by taking a representative portion of the melt-processed polyester, grinding to pass a 2 mm screen, and desorbing the contained AA from the polyester by heating at 150 deg C. for 45 minutes in a sealed vial. The desorbed AA was then analyzed using a gas chromatograph equipped with a flame ionization detector. Beverage AA levels were determined by removing a 5 ml aliquot of the beverage, placing the aliquot into a 20 ml vial, adding 1 gram of sodium chloride, and desorbing the contained AA at 80 deg C. for 30 minutes, followed by analysis of the beverage headspace using a gas chromatograph equipped with a flame ionization detector.

Examples 1–16

In the following examples, PET pellets were dried in a vacuum oven to between 50 and 100 ppm residual moisture. The selected additives were suspended in mineral oil, and were coated onto the PET pellets by tumbling. The resulting coated PET pellets were extruded at 510 deg F. through a ¾ inch single screw extruder. The total residence time for extrusion was 90 seconds. The resulting extruded PET was quenched in water. After 30 minutes of continuous extrusion, a portion of the extruded PET was isolated, ground, and subjected to analysis for AA content. The results below are reported as % decrease in AA content vs. a PET control containing the same amount of mineral oil. In all cases the mineral oil content was 0.2%. The equation for calculating the percent decrease in AA content is Percent decrease=(1−(AA content control−AA content test material)/(AA control))×100

| Example No. | Additive Compound | Ppm Additive | % AA Decrease |
|---|---|---|---|
| 1 | None | 0 | 0 |
| 2 | 2,3-diaminopyridine | 500 | 49 |
| 3 | Malonamide | 500 | 57 |
| 4 | 1,2-diaminocyclohexane | 500 | 20 |
| 5 | 3-mercapto-1,2-propanediol | 500 | 50 |
| 6 | Biuret | 500 | 42 |
| 7 | Salicylanilide | 500 | 59 |
| 8 | 3,4-diaminobenzoic acid | 500 | 85 |
| 9 | 4,5-dihyroxy-2,7-naphthalene disulfonic acid disodium salt | 500 | 30 |
| 10 | 1,2-diaminoanthraquinone | 500 | 44 |
| 11 | N-acetyl glycinamide | 500 | 15 |
| 12 | 4-amino-3-hydroxybenzoic acid | 500 | 27 |
| 13 | 1,8-diaminonaphthalene | 500 | 95 |
| 14 | 2-amino-2-methyl-1,3-propanediol | 500 | 35 |
| 15 | Allantoin | 500 | 64 |
| 16 | Anthranilamide | 500 | 71 |

Comparative Examples 17–29

In the following comparative examples, additives in examples 17–20, 25, 27, 28 and 29 lack the ability to form 5 or 6 member rings on condensation with AA. Additives in examples 21–24 and 26 are capable of forming 5 or 6 member rings, but lack sufficient thermal stability under the melt processing conditions employed. The processing and test conditions used were identical to those used in examples 1–16.

| Comparative Example No. | Additive Compound | Ppm Additive | % AA Decrease |
|---|---|---|---|
| 17 | Methyl anthranilate | 500 | <5 |
| 18 | Methyl anthranilate | 1000 | <5 |
| 19 | Dimethyl aminoterephthalate | 500 | <5 |
| 20 | Octadecanamide | 2000 | <5 |
| 21 | Cysteine | 500 | <5 |
| 22 | Arginine | 500 | <5 |
| 23 | Serine | 500 | <5 |

-continued

| Comparative Example No. | Additive Compound | Ppm Additive | % AA Decrease |
|---|---|---|---|
| 24 | Asparagine | 500 | <5 |
| 25 | Stearylamine | 500 | <5 |
| 26 | Aspartic acid | 500 | <5 |
| 27 | Glycine | 500 | <5 |
| 28 | 5-Aminol,3,3-trimethylcyclohexylamine | 500 | <5 |
| 29 | Piperazine | 500 | <5 |

It should also be noted that the compounds listed in Examples 21–27 are specifically recited by Igarashi as being effective in decreasing the AA content in PET.

Examples 30–36

In the following examples illustrating embodiments of the present invention, 26.5 gram preforms were injection molded on a unit-cavity Arburg press. In all of these examples, an 0.84 IV PET was dried to less than about 50 ppm moisture, and the selected additives were coated onto the PET as described above. Injection molding was carried out with at 510 deg F. and a 29 second cycle time. The preforms were analyzed for ppm AA content by cutting off the threaded finish, and preparing the sample as described above.

| Example No. | Additive | Ppm Additive | Ppm AA content |
|---|---|---|---|
| 30 | None | 0 | 8.25 |
| 31 | 1,8-diaminonaphthalene | 200 | 2.44 |
| 32 | 2-amino-2-methyl-1,3-propanediol | 500 | 5.79 |
| 33 | Anthranilamide | 500 | 2.13 |
| 34 | Salicylanilide | 500 | 6.65 |
| 35 | Salicylamide | 500 | 6.28 |
| 36 | 3,4-diaminobenzoic acid | 200 | 2.58 |

Examples 37–46

In the following examples 37–46 illustrating embodiments of the present invention, preforms were molded as in Examples 30–36, using anthranilamide as the additive at different levels and at two different molding temperatures. Bottles were blown from the preforms, and color values for both preforms and bottles were recorded. The color values were determined using standard L* and b* methodology. Lower b* values indicate less coloration.

| Example No | Ppm anthranilamide | Molding Temp (F.) | Preform AA | Preform Color L* | Preform Color b* |
|---|---|---|---|---|---|
| 37 | 0 | 510 | 8.04 | 81.71 | 2.10 |
| 38 | 100 | 510 | 5.54 | 82.12 | 2.84 |
| 39 | 250 | 510 | 3.39 | 81.56 | 4.11 |
| 40 | 500 | 510 | 1.70 | 81.67 | 5.67 |
| 41 | 1000 | 510 | 0.84 | 79.92 | 6.37 |
| 42 | 0 | 540 | 13.74 | 82.24 | 2.31 |
| 43 | 250 | 540 | 7.50 | 82.03 | 4.43 |
| 44 | 500 | 540 | 3.16 | 81.83 | 5.80 |
| 45 | 1000 | 540 | 1.41 | 79.42 | 6.17 |
| 46 | 500 | 510 | 2.45 | 79.21 | 5.90 |

In example 46, the anthranilamide was dispersed onto the PET pellets as a water slurry. The pellets were subsequently dried under normal conditions in a vacuum oven at 320 deg F.

Example 47

PET was melt polymerized under standard conditions to a 0.65 IV. At the end of polycondensation, 500 ppm of anthranilamide was added to the molten polymer and stirred for 2 minutes. The polymer was extruded, chopped, and analyzed for ppm AA content. A control sample was made the same way but without addition of anthranilamide. The polymer without addition of the anthranilamide had an AA content of 37 ppm; the polymer sample after addition of the anthranilamide had an AA content of 4.8 ppm.

Example 48

A suspension of anthranilamide was prepared by slurrying 5 kg of anthranilamide into 15 kg of ColorMatrix color carrier. This suspension was fed into a Husky Super G 96 cavity injection molder that was molding 26.5 gram preforms using KoSa 1102 (0.84 IV) polyester resin. The process temperature was 540 deg F. and total residence time was 110 seconds. The letdown level was 0.2% (0.2 lbs of additive per hundred pounds of PET), and the anthranilamide concentration in the polymer was 500 ppm. The molded preforms from the six high cavities had an average AA content of 1.25 ppm AA, vs. 7.5 ppm AA in preforms from the same cavities where anthranilamide had not been added.

Bottles were blown from both the control and the anthranilamide-containing preforms. Both sets were filled with ozonated water, capped, and stored at 40 deg C. for 52 days. Analysis of the water showed that the controls had an average of 79 ppb AA in the water, vs. an average of 5 ppb for the samples containing 500 ppm anthranilamide.

Examples 49–54

In the following examples, the anthranilamide was added by using the masterbatch approach. Anthranilamide was melt blended with PET resin in a twin screw extruder and re-chipped into pellets. The master batches were made at 20 wt % and 30 wt % anthranilamide concentrations. The masterbatch chips were then mixed with regular PET chips at the desired level necessary to obtain a final average anthranilamide concentration of 500 ppm and 1200 ppm. The mixed chips were dried and injected into 48 gram preforms at 560 deg F. (293 deg C.). In these examples, the AA content was determined by taking a representative portion of the melt-processed polyester preform, grinding to pass a 2 mm screen, and heating the samples at 160 deg C. for 90 minutes in a sealed vial. The desorbed AA was then analyzed using a gas chromatograph equipped with a flame ionization detector. The ground preform AA results and the yellowness results are summarized in the following table. The masterbatch approach shows similar AA reduction efficiency compared to the approach of adding anthranilamide with at the extruder throat in a liquid carrier.

| Example No. | Anthranilamide (ppm) | Masterbatch PET/anthranilamide wt/wt | Preform AA at 560° F. (ppm) | Preform Color b* |
|---|---|---|---|---|
| 49 | 0 | — | 15.3 | 4.1 |
| 50 | 500 | 80/20 | 3.9 | 16.2 |
| 51 | 1200 | 80/20 | 2.1 | 17.9 |
| 52 | 0 | — | 16.0 | 4.1 |
| 53 | 500 | 70/30 | 3.5 | 15.9 |
| 54 | 1200 | 70/30 | 1.9 | 18.1 |

It should be understood that the foregoing relates to particular embodiments of the present invention, and that numerous changes may be made therein without departing from the scope of the invention as defined by the following claims.

We claim:

1. A method for decreasing acetaldehyde content of melt-processed polyester comprising combining with polyester an organic additive compound comprising at least two hydrogen-substituted heteroatoms bonded to carbons of the organic additive compound, the organic additive compound being reactive with acetaldehyde in the polyester to form water and a resulting organic compound comprising an unbridged 5- or 6-member ring including the at least two heteroatoms.

2. The method of claim 1 wherein the heteroatoms are selected from the group consisting of O, S, and N.

3. The method of claim 1 wherein the organic additive compound includes a preformed ring.

4. The method of claim 3 wherein the preformed ring is an aromatic ring.

5. The method of claim 4 wherein the unbridged 5 or 6-member ring of the resulting organic compound is bonded to the aromatic ring.

6. The method of claim 1 wherein the two heteroatoms are both nitrogen.

7. The method of claim 1 wherein the additive compound is selected from the group consisting of 1,8-diaminonaphthalene, 3,4-diaminobenzoic acid, anthranilamide, biuret, malonamide, and allantoin.

8. The method of claim 1 wherein the additive compound is selected from the group consisting of anthranilamide, salicyclamide, salicylanilide, o-phenylenediamine, 3,4-diaminobenzoic acid, 1, 8-diaminonaphthalene, o-mercaptobenzamide, N-acetylglycinamide, malonamide, 3-mercapto-1,2-propanediol, 4-amino-3-hydroxybenzoic acid, 4, 5-dihydroxy-2,7-naphthalenedisulfonic acid disodium salt, biuret, 2, 3-diaminopyridine, 1,2-diaminoanthraquinone, dianilinoethane, allantoin, 2-aminobenzenesulfonamide,and 2-amino-2-methyl-1,3-propanediol.

9. The method of claim 1 wherein the additive compound is anthranilamide.

10. The method of claim 1 wherein the additive compound is combined with the polyester in an amount in the range of about 10 to about 1000 ppm.

11. The method of claim 1 wherein the organic additive compound comprises at least two functional groups including the at least two hydrogen-substituted heteroatoms, respectively, the at least two functional groups selected from the group consisting of amine, hydroxyl, carboxyl, amide, sulfonamide, and thiol groups.

12. The method of claim 1 wherein the organic additive compound is substantially thermally stable at the melt-processing temperature of the polyester.

13. The method of claim 1 wherein the organic additive compound has a thermal decomposition temperature greater than about 270 C.

14. The method of claim 1 wherein the organic additive compound has a thermal decomposition temperature greater than about 300 C.

15. The method of claim 1 wherein the organic additive compound is substantially unreactive with the polyester.

16. The method of claim 1 wherein the polyester is formed from ethylene glycol and diacids or diesters of such acids.

17. A container made in accordance with a method comprising:
combining with polyester an organic additive compound comprising at least awo hydrogen-substituted heteroatoms bonded to carbons of the organic additive compounds, the organic additive compound being reactive with acetaldehyde in the polyester to form water and a resulting organic compound comprising an unbridged 5- or 6-member ring including the at least two heteroatoms; and
forming a container with the polyester.

18. A container as in claim 17 wherein the container is a preform.

19. A packaged beverage comprising a beverage disposed in the container of claim 17.

20. A composition for use in making polyester items with decreased acetaldehyde content comprising polyester and an organic additive compound comprising at least two hydrogen-substituted heteroatoms bonded to carbons of the organic additive compound such that the organic additive compound is reactive with acetaldehyde in the polyester to form water and a resulting organic compound comprising an unbridged 5- or 6-member ring including the at least two heteroatoms.

* * * * *

UNITED STATES PATENT AND TRADEMARK OFFICE
CERTIFICATE OF CORRECTION

PATENT NO. : 6,274,212 B1  
APPLICATION NO. : 09/510014  
DATED : February 22, 2000  
INVENTOR(S) : Mark Rule et al.

It is certified that error appears in the above-identified patent and that said Letters Patent is hereby corrected as shown below:

Please replace the chemical formulas at col. 5, lines 20-30 with the following:

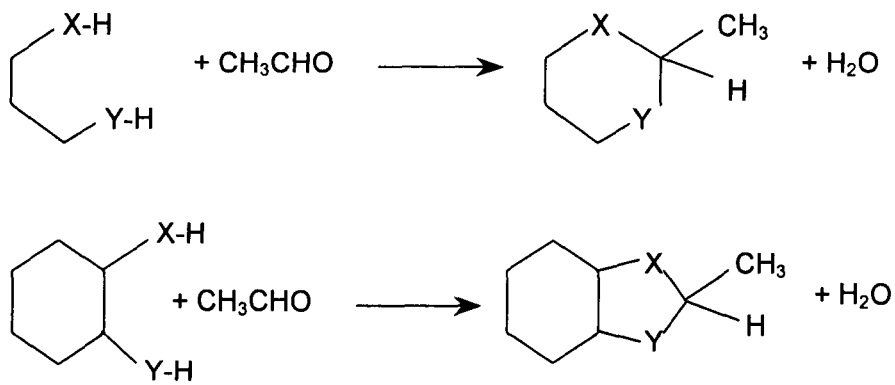

Signed and Sealed this

Thirty-first Day of October, 2006

JON W. DUDAS  
*Director of the United States Patent and Trademark Office*

UNITED STATES PATENT AND TRADEMARK OFFICE
CERTIFICATE OF CORRECTION

PATENT NO. : 6,274,212 B1 Page 1 of 1
APPLICATION NO. : 09/510014
DATED : August 14, 2001
INVENTOR(S) : Mark Rule et al.

It is certified that error appears in the above-identified patent and that said Letters Patent is hereby corrected as shown below:

Please replace the chemical formulas at col. 5, lines 20-30 with the following:

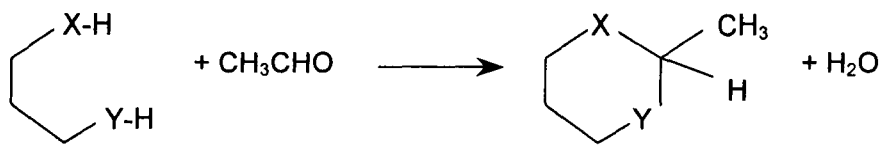

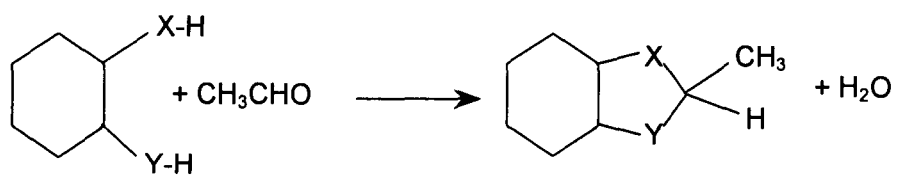

This certificate supersedes Certificate of Correction issued October 31, 2006.

Signed and Sealed this

Nineteenth Day of December, 2006

JON W. DUDAS
*Director of the United States Patent and Trademark Office*